US011010052B2

(12) United States Patent
Martin et al.

(10) Patent No.: US 11,010,052 B2
(45) Date of Patent: May 18, 2021

(54) COMPUTING DEVICES HAVING DYNAMICALLY CONFIGURABLE USER INPUT DEVICES, AND METHODS OF OPERATING THE SAME

(71) Applicant: Google LLC, Mountain View, CA (US)

(72) Inventors: Alberto Martin, Los Altos, CA (US); Katie Leah Roberts-Hoffman, San Jose, CA (US); Alexander Friedrich Kuscher, San Francisco, CA (US); Benjamin Goldsmith, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/592,129

(22) Filed: Oct. 3, 2019

(65) Prior Publication Data
US 2020/0034019 A1 Jan. 30, 2020

Related U.S. Application Data

(63) Continuation of application No. 15/439,165, filed on Feb. 22, 2017, now Pat. No. 10,474,358.
(Continued)

(51) Int. Cl.
G06F 3/048 (2013.01)
G06F 3/0489 (2013.01)
(Continued)

(52) U.S. Cl.
CPC .......... *G06F 3/0489* (2013.01); *G06F 1/1662* (2013.01); *G06F 1/1671* (2013.01);
(Continued)

(58) Field of Classification Search
CPC ...... G06F 3/0489; G06F 9/451; G06F 40/171; G06F 40/221; G06F 1/1662;
(Continued)

(56) References Cited

U.S. PATENT DOCUMENTS 4,447,692 A 5/1984 Mierzwinski et al.
5,920,316 A 7/1999 Oran et al.
(Continued)

FOREIGN PATENT DOCUMENTS

CN 1575486 A 2/2005
CN 101669086 A 3/2010
(Continued)

OTHER PUBLICATIONS

First Office Action with English translation for Chinese Application No. 201780003495.5, dated Oct. 9, 2020, 36 pages.
(Continued)

*Primary Examiner* — David Phantana-angkool
(74) *Attorney, Agent, or Firm* — Brake Hughes Bellermann LLP

(57) ABSTRACT

A computing device may include one or more dynamically configurable user input devices. In one example, a triggering event, such as, for example, a user input at a user interface of the computing device, may be detected in connection with an application running on the computing device. In response to the detected triggering event, individual elements of the user interface, such as, for example, keys of a keyboard, may be configured, and/or re-configured, to correspond to the input received and/or the application running on the computing device.

17 Claims, 17 Drawing Sheets

Related U.S. Application Data

(60) Provisional application No. 62/301,343, filed on Feb. 29, 2016.

(51) Int. Cl.

| | | |
|---|---|---|
| *G06F 9/451* | (2018.01) | |
| *G06F 1/16* | (2006.01) | |
| *G06F 3/0354* | (2013.01) | |
| *G06F 40/171* | (2020.01) | |
| *G06F 40/221* | (2020.01) | |
| *G06F 3/023* | (2006.01) | |
| *G06F 3/0488* | (2013.01) | |

(52) U.S. Cl.
CPC .......... *G06F 1/1692* (2013.01); *G06F 3/0238* (2013.01); *G06F 3/03547* (2013.01); *G06F 3/04886* (2013.01); *G06F 9/451* (2018.02); *G06F 40/171* (2020.01); *G06F 40/221* (2020.01)

(58) Field of Classification Search
CPC .... G06F 1/1671; G06F 1/1692; G06F 3/0238; G06F 3/03547; G06F 3/04886
USPC .......................................................... 715/760
See application file for complete search history.

(56) References Cited

U.S. PATENT DOCUMENTS

| | | | |
|---|---|---|---|
| 7,530,026 | B2 | 5/2009 | Chaudhri et al. |
| 7,770,135 | B2 | 8/2010 | Fitzmaurice |
| 8,566,732 | B2 | 10/2013 | Louch et al. |
| 8,954,871 | B2 | 2/2015 | Louch et al. |
| 9,092,132 | B2 | 7/2015 | Migos et al. |
| 9,113,193 | B1 | 8/2015 | Gardes et al. |
| 9,141,211 | B2* | 9/2015 | Feng ................ G06F 3/03547 |
| 9,189,250 | B2 | 11/2015 | Adams |
| 9,280,263 | B2 | 3/2016 | Kim |
| 9,898,162 | B2 | 2/2018 | Jisrawi et al. |
| 9,971,500 | B2 | 5/2018 | Yang et al. |
| 9,983,742 | B2* | 5/2018 | King ................ G06F 3/04847 |
| 10,114,485 | B2* | 10/2018 | Su ..................... G06F 3/04883 |
| 10,235,043 | B2* | 3/2019 | Bowers ............... G06F 1/1669 |
| 10,394,449 | B2* | 8/2019 | Louch ................. G06F 3/0238 |
| 10,409,412 | B1* | 9/2019 | Andre ................. G06F 3/0202 |
| 10,656,683 | B2* | 5/2020 | Dreessen ............. G06F 3/0482 |
| 10,656,719 | B2* | 5/2020 | Degner ............... G06F 3/04886 |
| 10,732,676 | B2* | 8/2020 | Xu ...................... G02B 6/0076 |
| 10,732,996 | B2* | 8/2020 | Dreessen ............. G06F 1/1692 |
| 2004/0217939 | A1 | 11/2004 | Levy et al. |
| 2006/0265662 | A1 | 11/2006 | Gertzen |
| 2007/0013662 | A1* | 1/2007 | Fauth ................... G06F 3/016 345/168 |
| 2009/0146960 | A1* | 6/2009 | Gim .................... G06F 3/0219 345/172 |
| 2012/0127000 | A1 | 5/2012 | Yassa et al. |
| 2012/0146912 | A1 | 6/2012 | Chen et al. |
| 2013/0044060 | A1* | 2/2013 | Lee ..................... G06F 3/04886 345/168 |
| 2014/0237398 | A1 | 8/2014 | Harris et al. |
| 2015/0103014 | A1* | 4/2015 | Kim ..................... G06F 3/03545 345/173 |
| 2015/0370339 | A1* | 12/2015 | Ligtenberg ............ G06F 1/1662 345/168 |
| 2015/0378546 | A1* | 12/2015 | Osborne ............... G06F 1/1692 715/833 |
| 2017/0285894 | A1* | 10/2017 | Barrus .................. G06F 9/485 |
| 2018/0088799 | A1* | 3/2018 | Louch .................. G06F 3/0238 |
| 2020/0192497 | A1* | 6/2020 | Knoppert ............. G06F 3/0412 |

FOREIGN PATENT DOCUMENTS

| | | |
|---|---|---|
| CN | 101828379 A | 9/2010 |
| CN | 102447781 A | 5/2012 |
| CN | 102750106 A | 10/2012 |
| CN | 108139866 A | 6/2018 |
| EP | 2326068 A1 | 5/2011 |
| WO | 03019519 A1 | 3/2003 |
| WO | 2013133686 A1 | 9/2013 |
| WO | 2017151371 A1 | 9/2017 |

OTHER PUBLICATIONS

International Preliminary Report on Patentability for International Application No. PCT/US2017/019026, dated Sep. 13, 2018, 7 pages.

"Jaasta E-ink Keyboard", retrieved on Nov. 19, 2015 from http://theawesomer.com/jaastaeinkkeyboard/303666/, 5 pages.

"Sonder Design", retrieved on Nov. 19, 2015 from https://www.sonderdesign.com/, 6 pages.

Anonymous, "Jaasta E-ink Keyboard", retrieved from web.archive.org/web/20151030170942/http://theawesomer.com/jaasta-e-ink-keyboard/303666, Oct. 30, 2015, pp. 1-5.

Bright, "Stop trying to innovate keyboards. You're just making them worse", retrieved on Nov. 19, 2015 from http://arstechnica.com/staff/2014/01/stoptryingtoinnovatekeyboardsyourejustmakingthemworse/, Jan. 17, 2014, 6 pages.

Liszewski, "The Morphing E-Ink Keyboard May (Almost) Finally Be Here", Dec. 23, 2014, 6 pages.

Mendoza, "Microsoft's 'DisplayCover' Is A Keyboard Tablet With E-Ink Touchscreen", retrieved on Nov. 19, 2015 from http://www.techtimes.com/articles/79177/20150825/microsoftsdisplaycoverisakeyboardtabletwitheinktouchscreen.htm, Aug. 25, 2015, 4 pages.

Paul, "Microsoft's DisplayCover prototype gives the Surface keyboard an e-ink display", Aug. 25, 2015, 4 pages.

International Search Report and Written Opinion for PCT Application No. PCT/US2017/019026, dated May 23, 2017, 13 pages.

\* cited by examiner

COMPUTING DEVICES HAVING DYNAMICALLY CONFIGURABLE USER INPUT DEVICES, AND METHODS OF OPERATING THE SAME

CROSS REFERENCE TO RELATED APPLICATION

This application is a continuation of, and claims priority to, U.S. patent application Ser. No. 15/439,165, filed on Feb. 22, 2017, entitled "COMPUTING DEVICES HAVING DYNAMICALLY CONFIGURABLE USER INPUT DEVICES, AND METHODS OF OPERATING THE SAME", which claims priority to U.S. Provisional Patent Application No. 62/301,343, filed on Feb. 29, 2016, entitled "COMPUTING DEVICES HAVING DYNAMICALLY CONFIGURABLE USER INPUT DEVICES, AND METHODS OF OPERATING THE SAME," the disclosures of which are incorporated herein by reference in their entirety.

FIELD OF THE DISCLOSURE

This disclosure relates generally to computing devices, and, more particularly, to computing devices having dynamically configurable user input devices, and methods of operating the same.

BACKGROUND

Computing devices have one or more user input devices that allow a user to provide inputs to the computing device. Example user input devices include, but are not limited to, keyboards, mice, trackpads, touchpads, touch displays, microphones, touch screens, etc. Example computing devices include, but are not limited to, portable computers, laptop computers, mobile devices (e.g., smartphones, media players, game players, mobile phones, etc.), desktop computers, etc.

SUMMARY

In one aspect, a computer-implemented method, may include detecting, by a processor of a computing device, a triggering event in an application executing on a computing device; determining, by the processor, a configuration of a user interface of the computing device associated with the application in response to the detected triggering event; and configuring electronic ink associated with at least a portion of the user interface of the computing device in response to the detected triggering event and the determined configuration.

In another aspect, a computer-implemented method may include detecting, by a processor of a computing device, a touch input at a user interface of a computing device, the touch input corresponding to a triggering event; determining, by the processor, a configuration of the user interface of the computing device in response to the detected triggering event; and displaying, at the user interface, user interface elements corresponding to the determined configuration of the user interface in response to the detected triggering event and the determined configuration.

DETAILED DESCRIPTION

Figure 1:
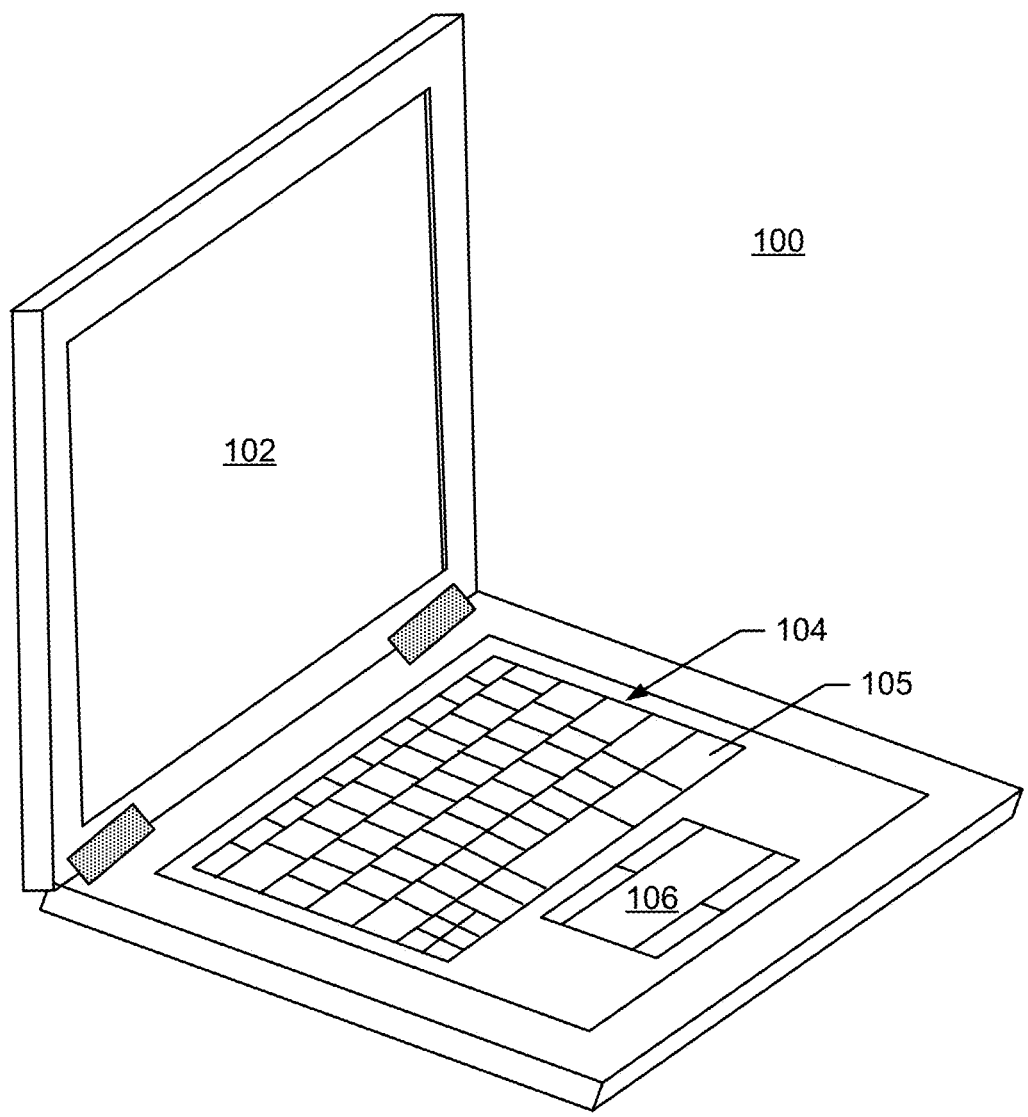
FIG. 1 is schematic illustration of an example portable computing device having a keyboard and a trackpad, in accordance with implementations as described herein.

Conventional input devices for computing devices have static assignments of functions and appearances to, for example, keys of a keyboard or touch regions of a touch screen. This can lead to an inefficient use of keys because they cannot be assigned or used in different ways based on the status of a computing device, an application executing thereon, etc. Further, while stickers can be applied to keys to help a user remember keyboard shortcuts, different applications may have different shortcuts leading to a conflict in which stickers to apply.

A method and apparatus, in accordance with implementations as described herein, may dynamically (re-)configure (e.g., adapt, change, modify, set, etc.) functions assigned to keys, and/or may dynamically (re-)configure the appearance of the keys based on, for example, the assigned functions and/or information to be displayed. In some implementations, the assignment of functions and changing of appearance disclosed herein can be performed dynamically during operation of a computing device and/or applications executing thereon. For example, the function and/or appearance of a key can be changed based on an application shortcut, a web browser, an application notification, to provide usage or status information, etc. In some examples, electrophoretic (e.g., electronic) ink (E ink) is used to change the appearance of a key, touch screen, touch pad, trackpad, etc.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s). These examples and variants and portions thereof shown in the attached drawings are not drawn to scale, with specific shapes, or with specific relative dimensions as they are not important to this disclosure and may render the drawings more difficult to comprehend. Specific elements may have been intentionally exaggerated for discussion purposes. Instead, the drawings have been drawn for clarity and comprehension. Further, the arrangement of elements and couplings maybe changed, rearranged, etc. according to other implementations of this disclosure and the claims herein.

FIG. 1 shows an example portable computing device in the form of a laptop computer 100. The example laptop computer 100 of FIG. 1, which may be battery powered, includes a display 102, a keyboard 104 having one or more keys (one of which is designated at reference numeral 105), and a trackpad 106 through which a user can interact with the laptop computer 100. The trackpad 106 may alternatively be implemented by a touch pad. A user may use the keyboard 104 and the trackpad 106 to enter commands, instructions, text, etc. for operating the laptop computer 100 and/or applications thereon (e.g., e-mail, word processing, Internet browsing applications, games, etc.). As described below, the trackpad 106 may be used to implement virtual keys and, thus, the trackpad 106 can be used together with or separate from the keyboard 104 to form a virtual keyboard and, thus, will be considered herein to form a keyboard. The display 102 may be a touch screen that may additionally be used to control the laptop computer 100.

Figure 15:
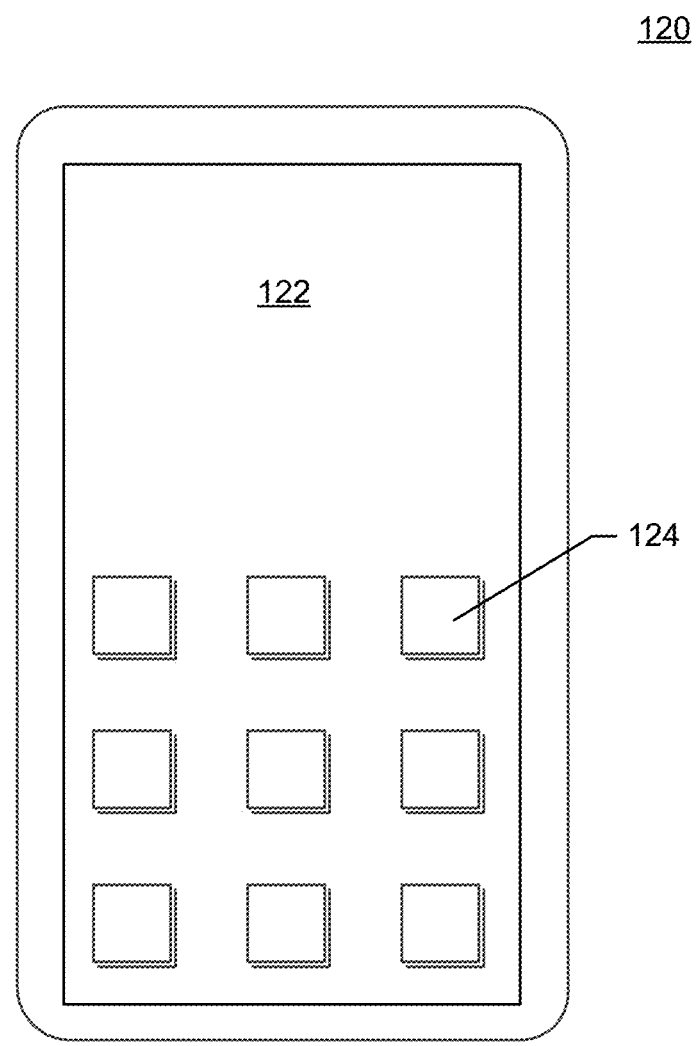
FIG. 15 is schematic illustration of a portable electronic device (e.g., a mobile phone) having a touch screen, in accordance with implementations as described herein.

Turning to FIG. 15, an example portable electronic device in the form of a mobile phone 120 built on a mobile computing platform, or an electronic tablet is shown. The example mobile phone 120 includes a touch screen 122 through which a user can interact with the mobile phone 120. A user may use non-mechanical touch zones (one of which is designated at reference numeral 124), and/or a mechanical and/or non-mechanical keyboard coupled with the mobile phone 120 to enter commands, instructions, text, etc. for operating the mobile phone 120, or applications thereon (e.g., e-mail, texting, Internet browser applications, games, etc.). While the keys 124 of FIG. 15 may be non-mechanical, taken together, the keys 124 form a virtual keyboard and, thus, will be considered herein to form a keyboard.

Figure 16:
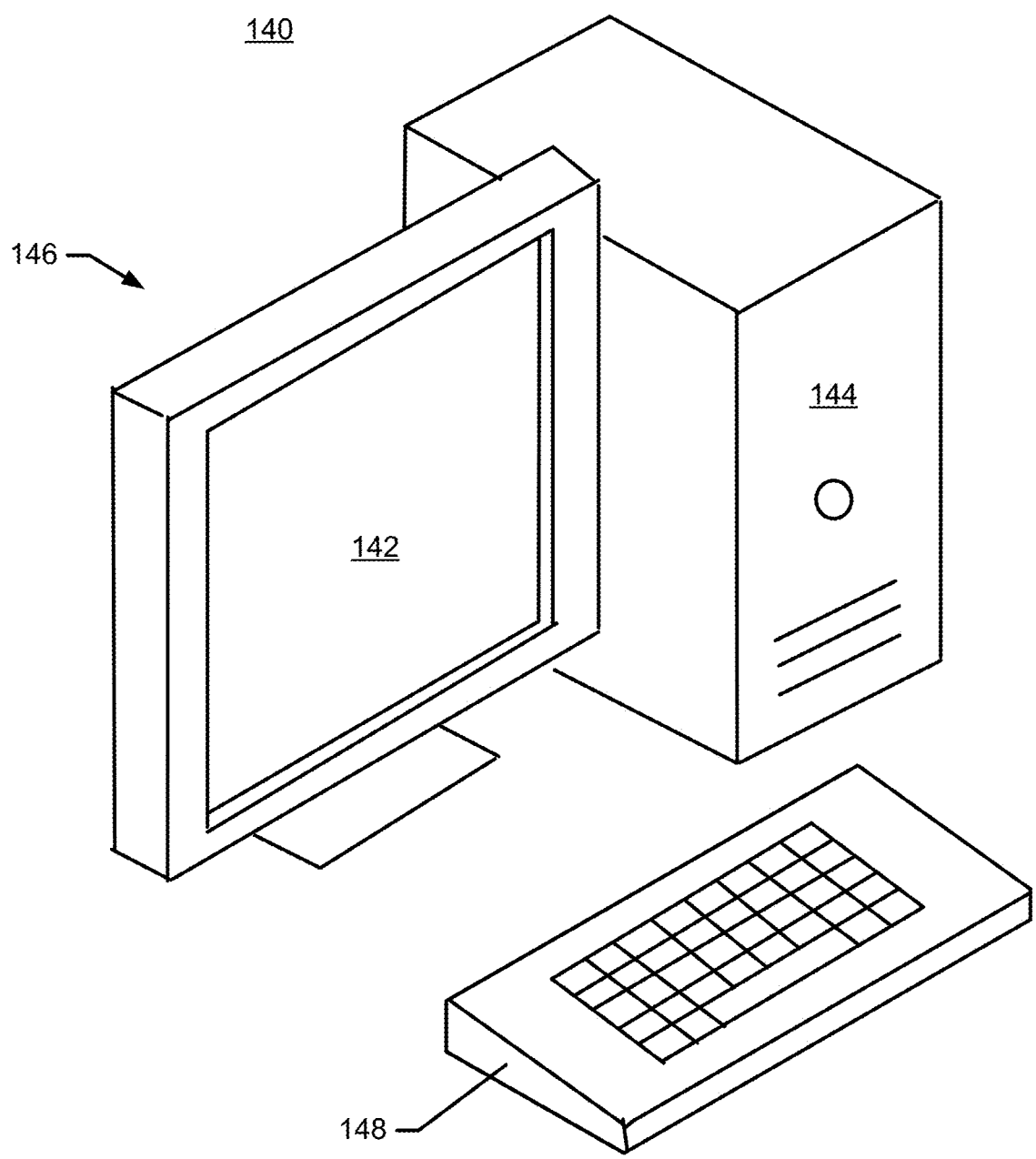
FIG. 16 is schematic illustration of a stationary computer system (e.g., a desktop computer) having a keyboard, in accordance with implementations as described herein.

FIG. 16 shows an example stationary computer system in the form of a desktop computer system 140. The example desktop computer system 140 of FIG. 16, includes a tabletop display 142, a computer 144 in the form of a desktop computer, and a keyboard 146 having one or more keys (one of which is designated at reference numeral 148). The computer 144 may be located on a desk, on the floor, on a shelf, mounted beneath a structure, in a rack, etc. A user may, for example, use the keyboard 146 to enter commands, instructions, text, etc. for operating the computer 144 or applications thereon (e.g., e-mail, word processing, internet browsing applications, etc.). The display 142 may be a touch screen that a user may additionally or alternatively be used to control the desktop computer system 140. The keyboard 146, which may be movable, may be battery powered and may be electrically and/or wirelessly coupled to the computer 144.

Figure 2:
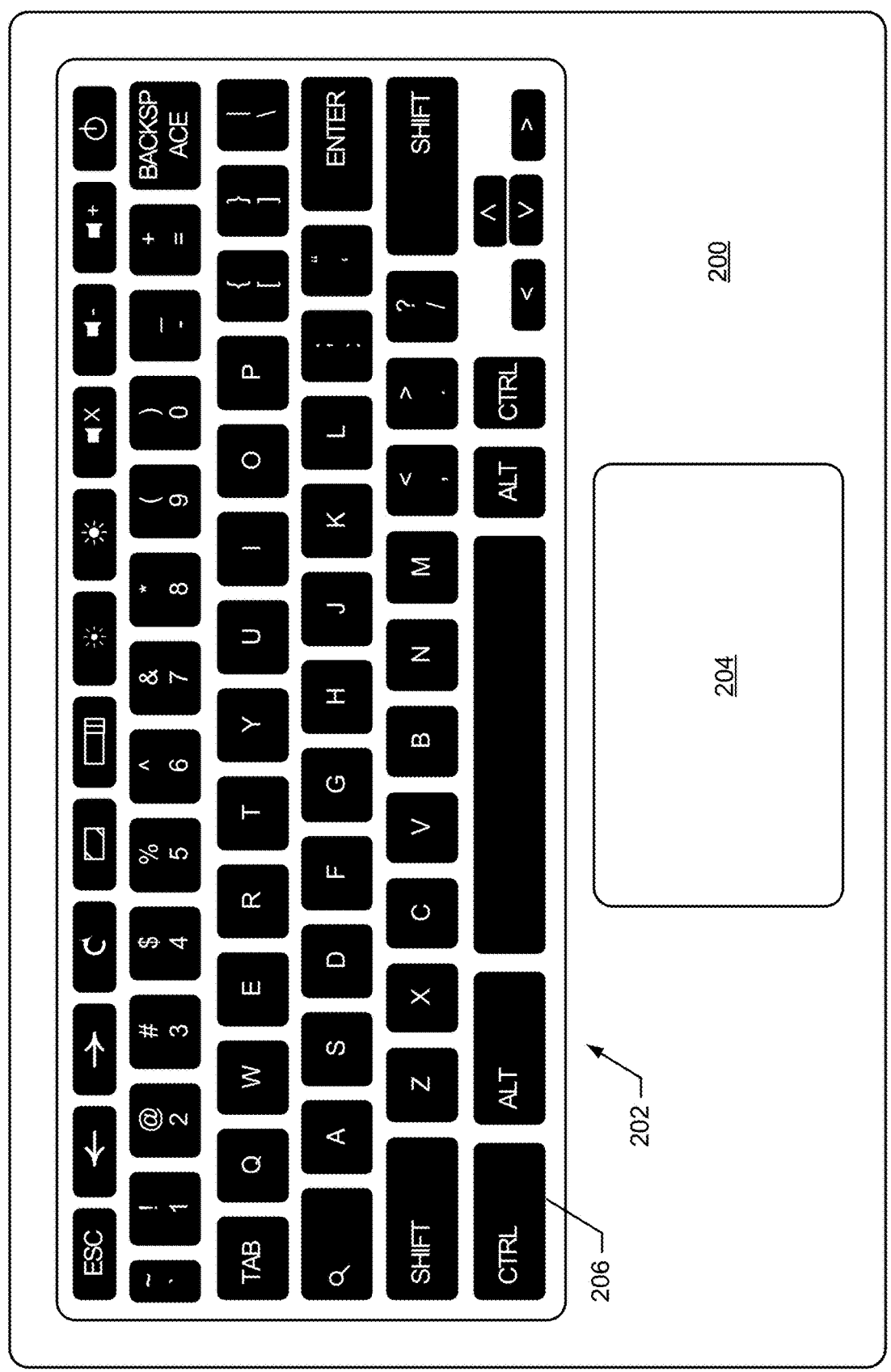
FIG. 2 is a top view of an example keyboard that may be used with the example computing devices shown in FIGS. 1, 15 and 16, in accordance with implementations as described herein.

Referring to FIG. 2, a top view of an example input device in the form of a keyboard 200 that may be used with the example computing devices of FIGS. 1, 15 and 16 is shown. The example keyboard 200 of FIG. 2 has a keypad 202 and a touchpad 204. The example keypad 202 of FIG. 2 has a plurality of keys (one of which is designated at reference numeral 206) arranged and configured to allow a user to operate a computing device. While a conventional example keypad arrangement is shown in FIG. 2, simply for ease of discussion and illustration, the keypad 202 may include other arrangements, shapes, contours, numbers of keys and the like. Moreover, as described below, the dynamic (re-) configuration of a key may be selectively, reversibly, variably, etc. changed during usage of the keyboard 200 or a computing device communicatively coupled to the keyboard 200. The dynamic (re-)configuration of a key corresponds to the function assigned to a key, and/or the appearance of a key (e.g., representing the function assigned to a key, information to be displayed, etc.). Not all keys of the keyboards disclosed herein need to be dynamically reconfigurable. For example, in some implementations, only certain subsets of keys, such as, for example, the keys of a function row (or another subset of keys), may be dynamically (re-)configurable. The keys 206 may be based on different switch technologies (e.g., dome switches, capacitive switches, Hall Effect switches, mechanical switches, capacitive touch, resistive touch, butterfly switches, etc.).

Figure 3:
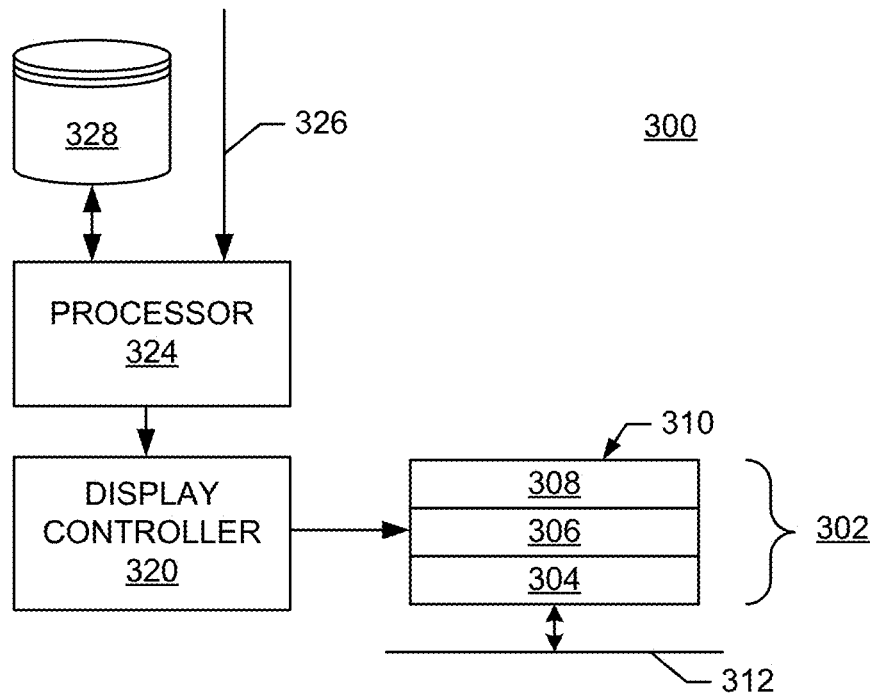
FIG. 3 is a schematic illustration of an example computing device having a configurable key for a keyboard, in accordance with implementations as described herein.

FIG. 3 is a schematic illustration of an example computing device 300 that may be used to implement a dynamically configurable key 302 of a keyboard. The example key 302 of FIG. 3 includes a key base 304, an E ink layer 306 on the key base 304, and a cover or other layer 308 on the E ink layer 306 to protect and/or enhance the appearance of the key 302. The E ink layer 306 is viewable through the layer 308 to allow the appearance of the key 302 to be configured.

A user can press the key 302 to move the key 302 down toward a base 312, and can release pressure on the key 302 to allow the key to move up relative to the base 312, to provide inputs.

To control the appearance of the E ink layer 306, the example computing device 300 of FIG. 3 includes a display controller 320 controlled by any number and/or type(s) of processors, one of which is designated at reference numeral 324. The example processor 324 of FIG. 3 can change the appearance of the key 302 by controlling the display controller 320 to change the appearance of the E ink layer 306 using any number and/or type(s) of commands, data, protocols, etc. Changes to the appearance of the E ink layer 306 may be implemented by the processor 324 and the display controller 320 in response to, for example, a user input, detection of a particular application, program and the like running on the computing device 300, and other such factors. That is, the example processor 324 can determine the appearance of the E ink layer 306 to configure based on information 326 (e.g., any number and/or type(s) of commands, data, protocols, etc.) received from, for example, another computing device such as a web server, an application, a key press, etc. The processor 324 may, additionally or alternatively, query a database 328 based on the received information 326 to determine the appearance of the key 302.

When the function assigned to the key 302 is changed, for example, in response to one of the factors described above, the processor 324 processes usages of the key 302 according to the assigned function, which may vary over time.

Figure 4:
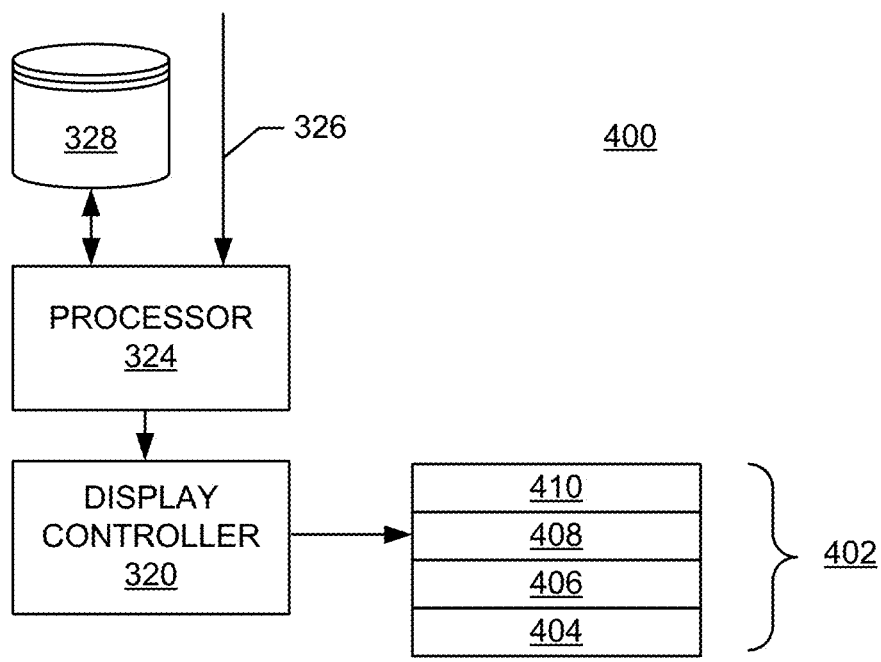
FIG. 4 is a schematic illustration of an example computing device having a configurable touch input zone of a touch input device, in accordance with implementations as described herein.

FIG. 4 is a schematic illustration of an example computing device 400 having a touch input zone in the form of a capacitive touch zone 402. The touch zone 402 may be used to implement a dynamically configurable touch screen, touchpad, trackpad (e.g., the trackpad 204 of FIG. 2), etc. The example capacitive touch zone 402 of FIG. 4 includes a capacitive touch region 404 that is, for example, mated to, adhered to and/or in-molded into a surface (e.g., a bottom surface) of a substrate 406. An E ink layer 408 is mated to, adhered to, and/or is in-molded into another surface (e.g., a top surface) of the substrate 406. A display surface 410 (e.g., glass) is positioned on the E ink layer 408. Other arrangements may be used. For example, the touch region 404 and the E ink layer 408 may be implemented by a circuit board mated to, adhered to and/or in-molded into a surface (e.g., a bottom surface) of the substrate 406. The example touch zone 402 may be controlled in a similar way as the example key 302 of FIG. 3.

Turning to FIGS. 5-13, various example dynamic configurations and/or re-configurations of a keyboard and trackpad are shown. While examples are shown in FIGS. 5-13, the configuration of keyboards, touchscreens, trackpads, touchscreens, etc. may be performed in response to any number and/or type(s) of other events, configurations, information, commands, key presses, etc. in addition to and/or alternative to those discussed in connection with FIGS. 5-13. Moreover, the configurations shown in FIGS. 5-13 may be combined. The function and the appearance of a key need not both be changed at the same time or at a different time. In some instances, the determination of how keyboards, touchscreens, trackpads, touch screens, etc. are configured may be made by a developer to, for example, move user interface elements from being displayed on a screen to being displayed on one or more keys to make additional space available on the screen for display of other elements.

FIGS. 5-11 illustrate various exemplary configurations A through K of a portion 510 of the example keyboard 202 of FIG. 2. The example portion 510 of the keyboard 202 shown in FIGS. 5-11 has a row of keys that are configurable. In these examples, the keys will be enumerated 511A through 511K, 512A through 512K, 513A through 513K, and the like, where the letter corresponds to a particular configuration being discussed, and the numerals refer to a respective key. Thus, a combination of a number and a letter designates a particular configuration of a particular key. While an example portion 510 is shown with a row of configurable keys, other portions with other numbers and/or arrangements of configurable keys may also be configured. For example, in addition to changing keys using E ink to indicate functionality, E ink may additionally and/or alternatively be used to change brightness and/or color. For instance, when a user is using a text processing application, non-letter keys could be selectively dimmed to help the user focus on relevant letter keys and reduce distraction from other keys.

Figure 5:
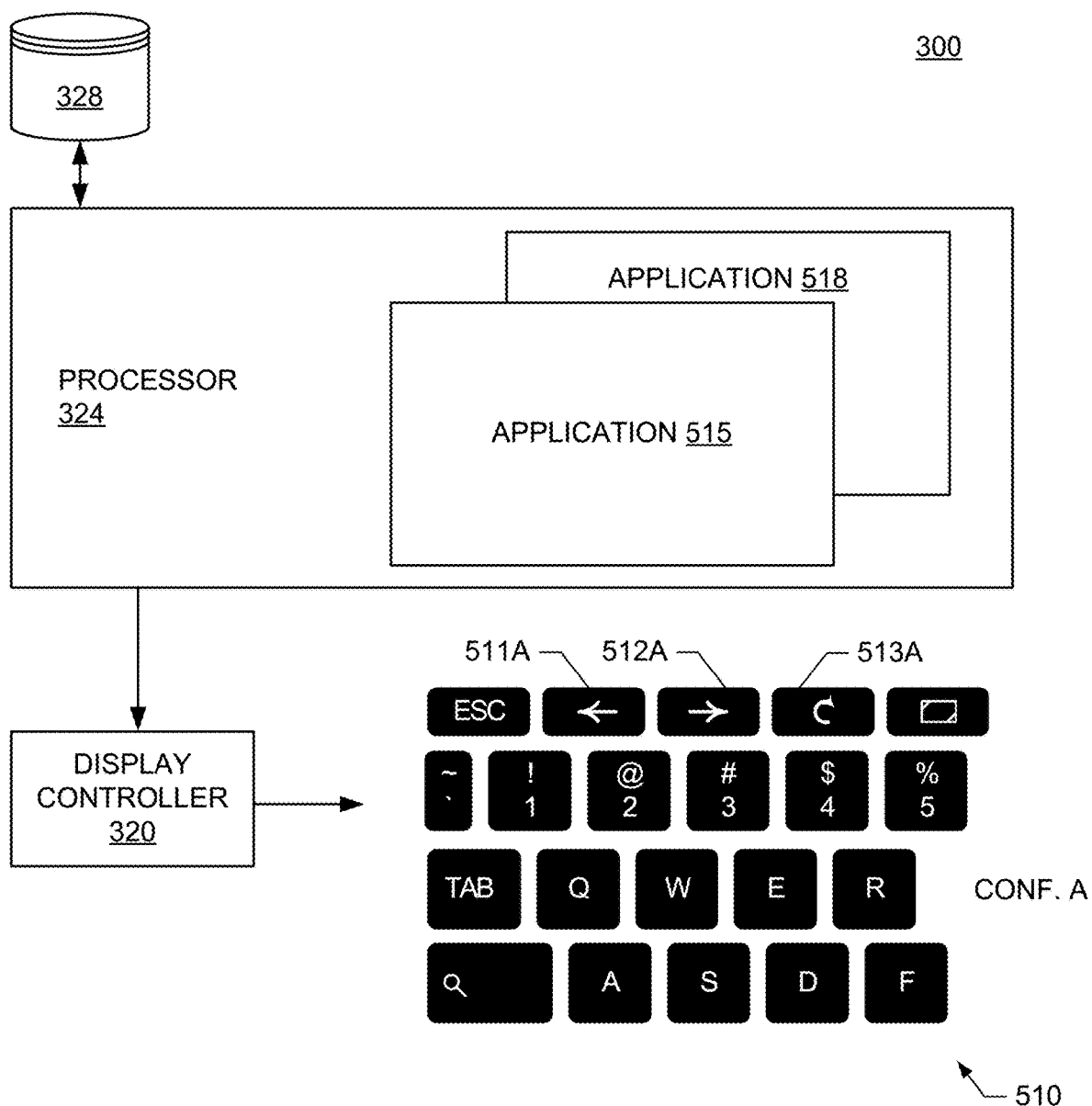
FIG. 5 is a schematic illustration of an example computing device having a portion of a keyboard configured corresponding to a first application, in accordance with implementations as described herein.

FIG. 5 is a schematic illustration of the example computing device 300 of FIG. 3 having the portion 510 configured in a Configuration A corresponding to an application 515. The example Configuration A shown in FIG. 5 may be a standard or default keyboard configuration, such as that shown in FIG. 2, corresponding to the application 515 which does not, in this example, make use of non-standard key configurations.

Figure 6:
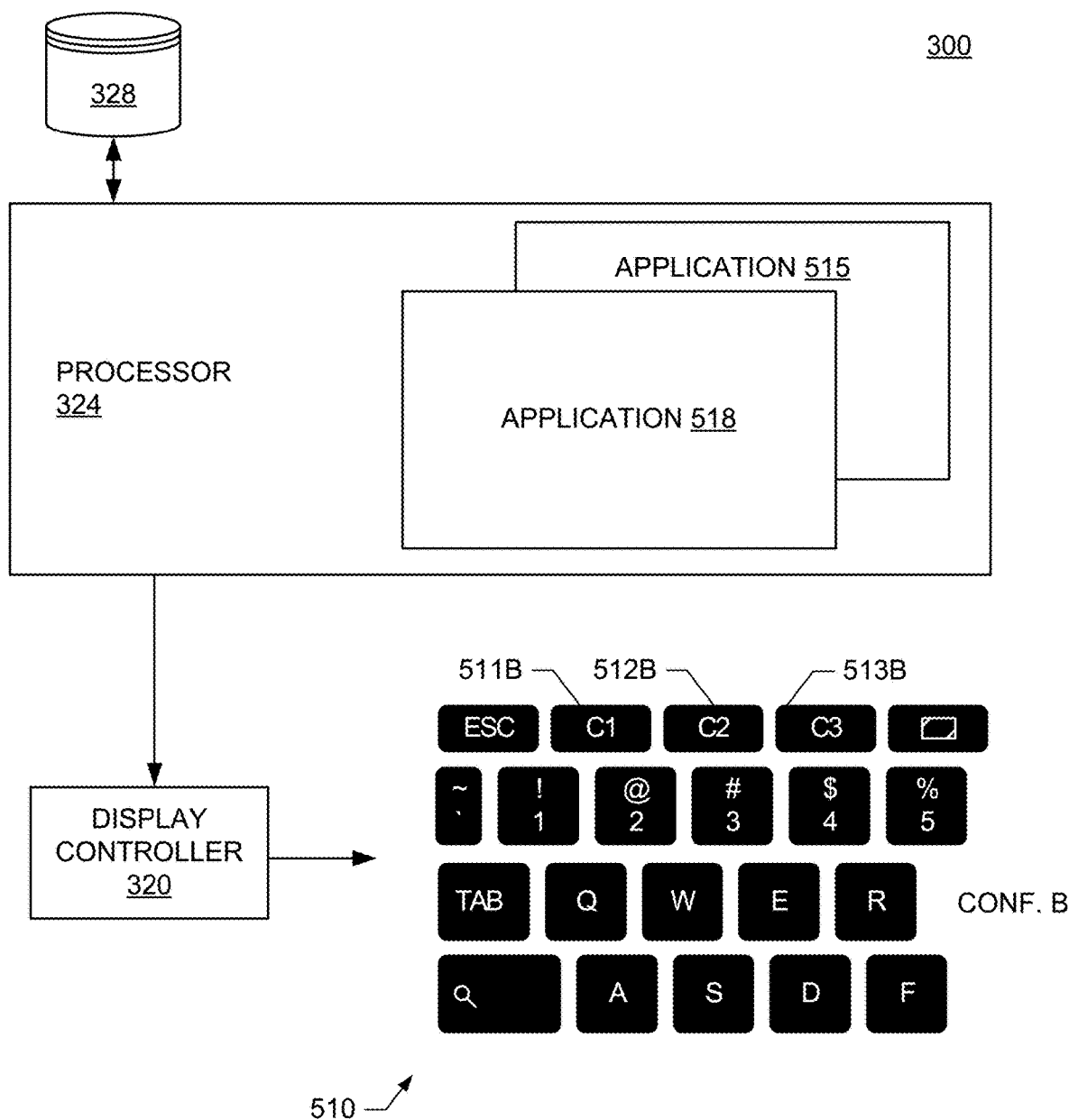
FIG. 6 is a schematic illustration of an example computing device having the portion of the keyboard of FIG. 5 configured corresponding to a second application, in accordance with implementations as described herein.

FIG. 6 is a schematic illustration of the example computing device 300 of FIG. 5, wherein the portion 510 has been configured in a Configuration B, corresponding to an application 518. The portion 510 shown in FIG. 6 is configured in the Configuration B so the keys 511B, 512B and 513B perform specific respective functions C1, C2, and C3 for the application 518, and the appearance of each key 511B, 512B and 513B has been configured to correspond to the functions C1, C2 and C3, so that the processor processes usage of the keys 511B, 512B and 513B according to their respectively assigned functions. That is, in this example, the portion 510 of the keyboard may be re-configured from the Configuration A shown in FIG. 5 to the Configuration B shown in FIG. 6 as the computing device 300 switches from executing the application 515 to executing the application 518. The function and/or appearance information for the configured keys 511A, 511B and 511C, and or the configured keys 511B, 512B and 513B, may be received from the application 515 or the application 518, and/or determined by querying the database 328.

Figure 7:
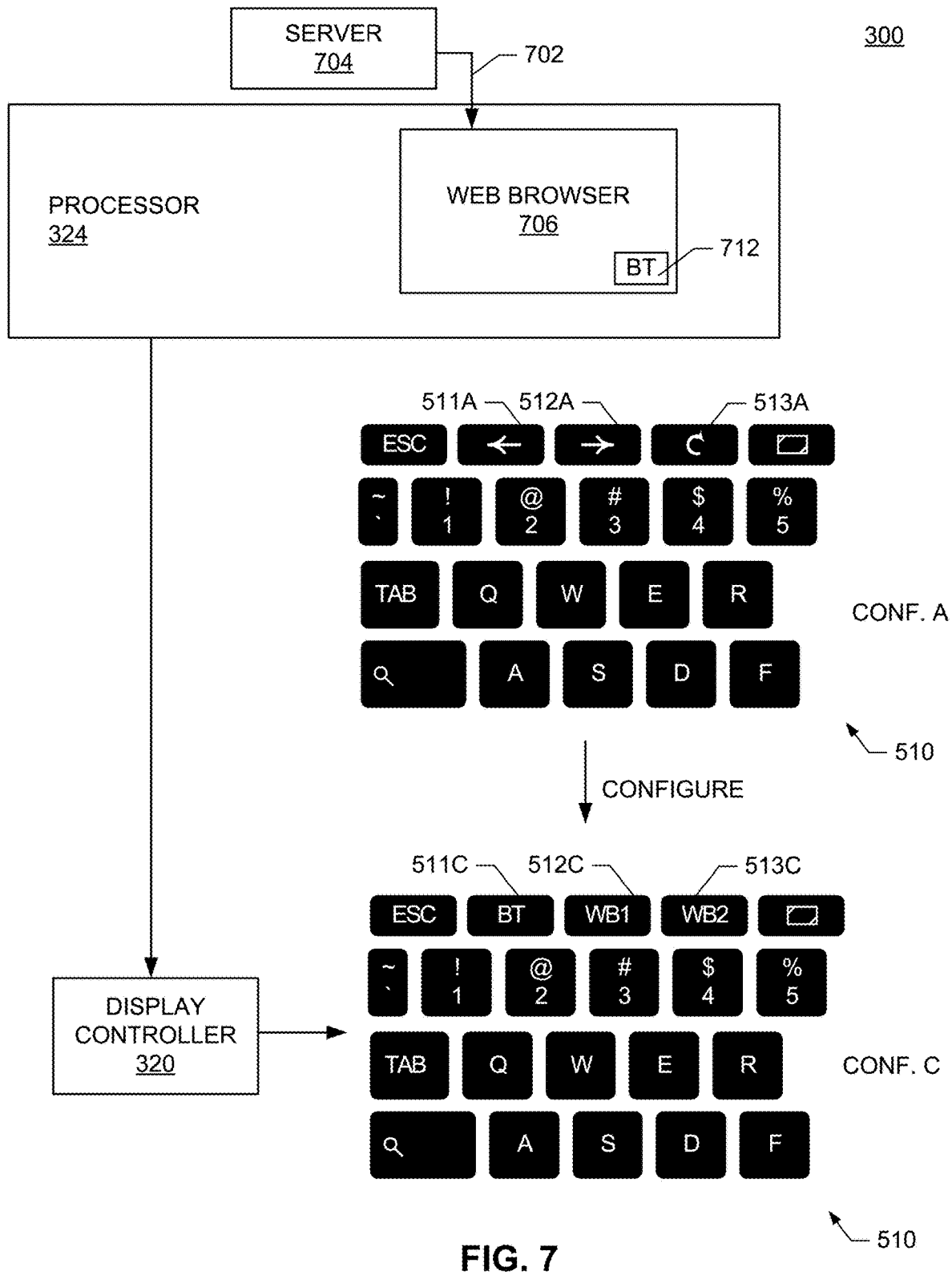
FIG. 7 is a schematic illustration of an example computing device configuring a portion of a keyboard in response to information provided by a web server, in accordance with implementations as described herein.

FIG. 7 is a schematic illustration of the example computing device 300 configuring (e.g., re-configuring) the example portion 510 of the keyboard from the Configuration A shown in FIG. 5 to a Configuration C in response to information (e.g., Hyper-Text Markup Language (HTML) code 702) provided by a web server 704 via a web browser 706. In some examples, a Document Object Model (DOM) can be obtained or extracted from the HTML code 702 provided by the web server 704. The DOM can be parsed by, for example, Java™ script to obtain embedded key control information from the HTML code 702. In response to the key control information embedded in the HTML code 702, the processor 324 via the display controller 320 may configure example keys 511C, 512C and 513C of the portion 510 of the keyboard as shown in FIG. 7. In the example of FIG. 7, the key 511C is configured to correspond to a button element 712 of a web page, and the keys 512C and 513C are configured to correspond to keyboard shortcuts WB1 and WB2 associated with the web page. The key 511C may, for example, allow a user to initiate payment for a purchase, log into an account, view an offer, etc. The shortcuts WB1 and WB2 may be, for example, links for local, regional and national news, emoticon selection, etc.

Figure 8:
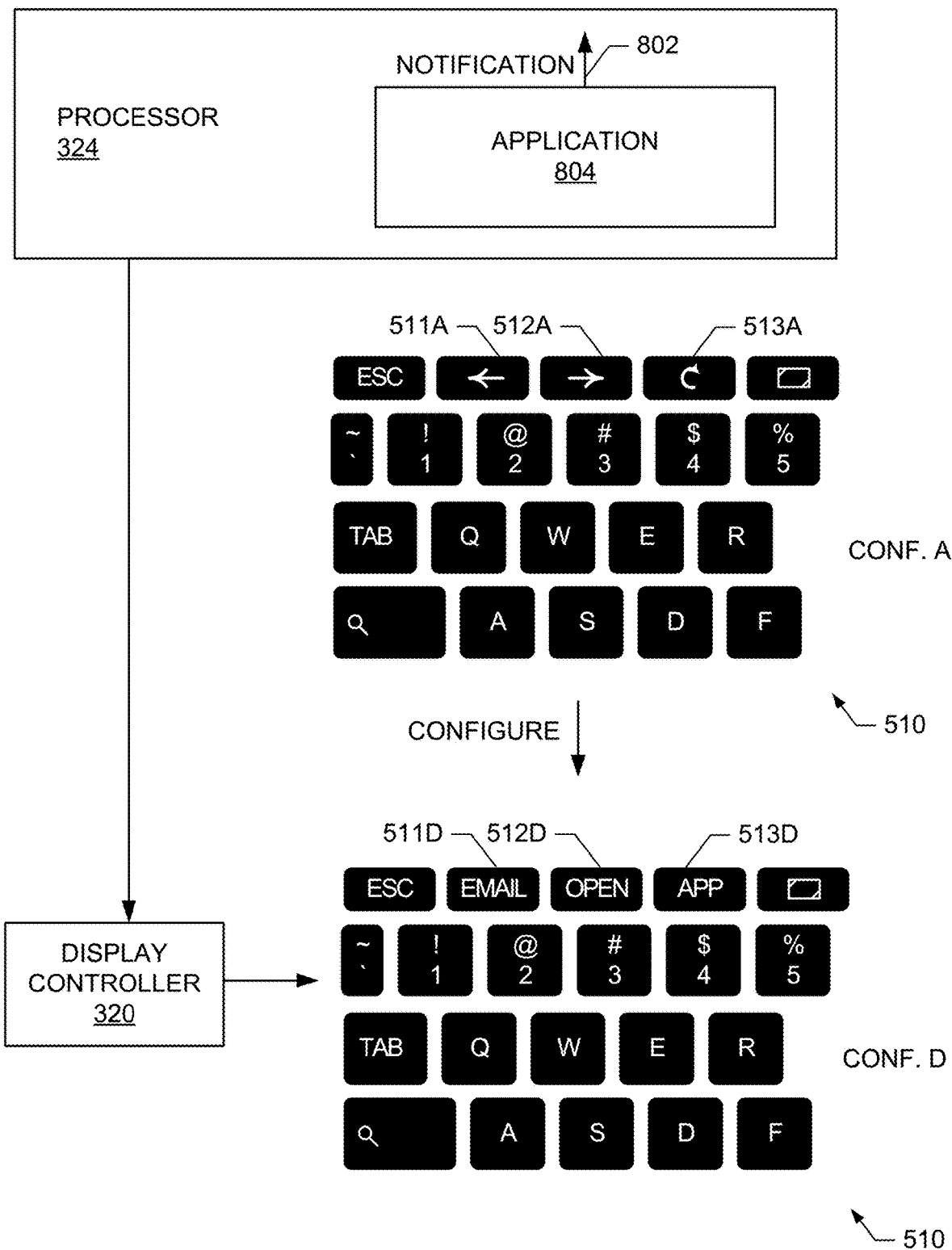
FIG. 8 is a schematic illustration of an example computing device configuring a portion of a keyboard in response to a notification generated by an application, in accordance with implementations as described herein.

FIG. 8 is a schematic illustration of the example computing device 300 configuring the example portion 510 of the keyboard from the Configuration A to a Configuration D in response to a notification 802 (e.g., a new email, an incoming message, an error, an alert, an offer, etc.) provided, output, generated, etc. by an application 804. In the example of FIG. 8, the application 804 outputs a new email notification 802. In response to the new email notification 802, the processor 324 via the display controller 320 configures example keys 511D, 512AD and 513D of the portion 510 according to the Configuration D. In the example of FIG. 8, the key 511D is configured to indicate the new email notification, and the keys 512D and 513D are configured to correspond to actions (e.g., open new email, open email application, etc.) that can be taken in response to the new email notification 802.

Figure 9:
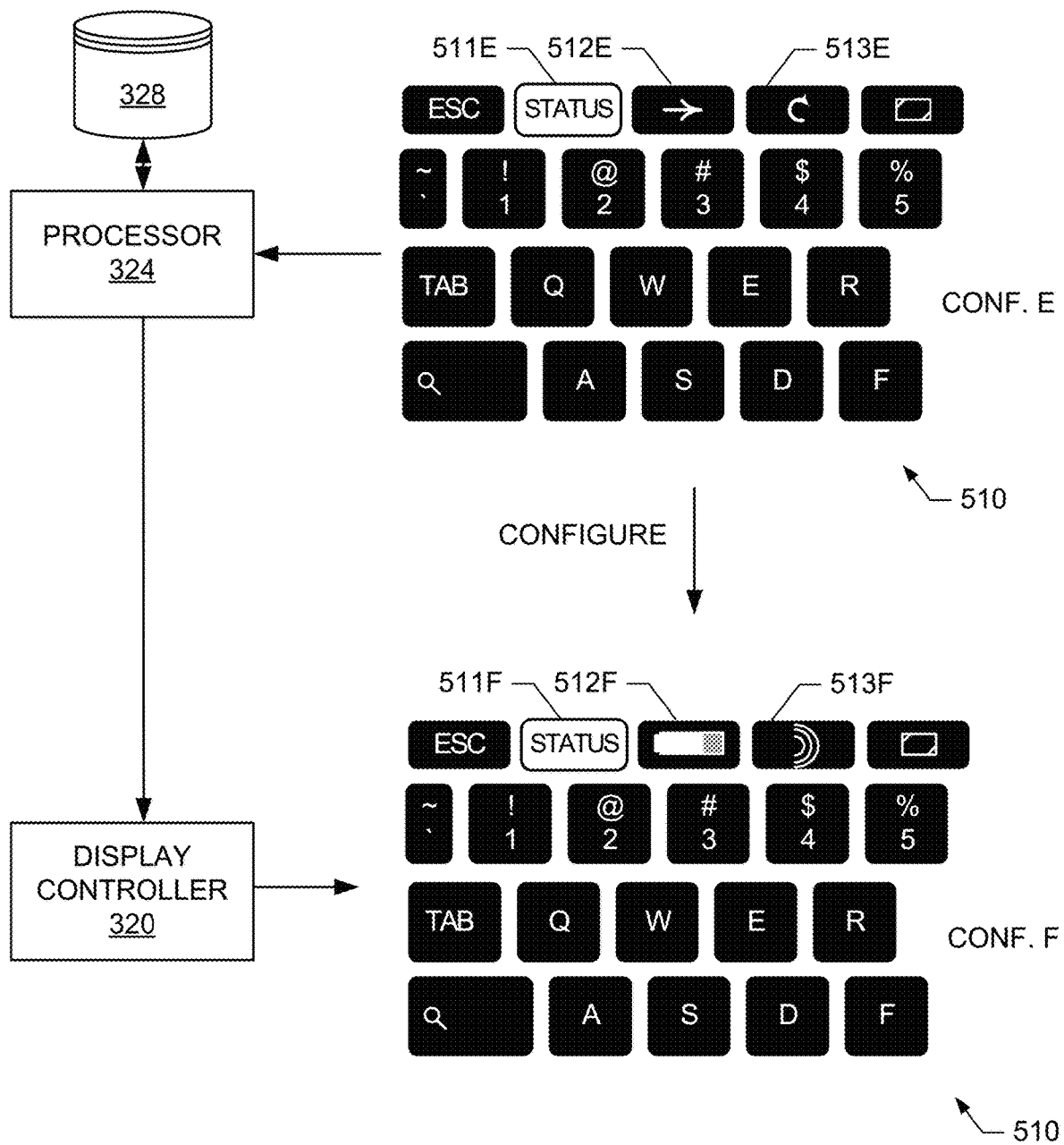
FIG. 9 is a schematic illustration of an example computing device configuring a portion of a keyboard in response to a key press, in accordance with implementations as described herein.

FIG. 9 is a schematic illustration of the example computing device 300 configuring the example portion 510 of the keyboard from a Configuration E to a Configuration F in response to an external input such as, for example, a key press and hold. In the example of FIG. 9, when a user presses and holds a STATUS key 511E, the processor 324 via the display controller 320 may configure the keys 512F and 513F to provide, for example, status information (e.g., battery status, Wi-Fi status, etc.) related to the functionality assigned to the key 511E.

Figure 10:
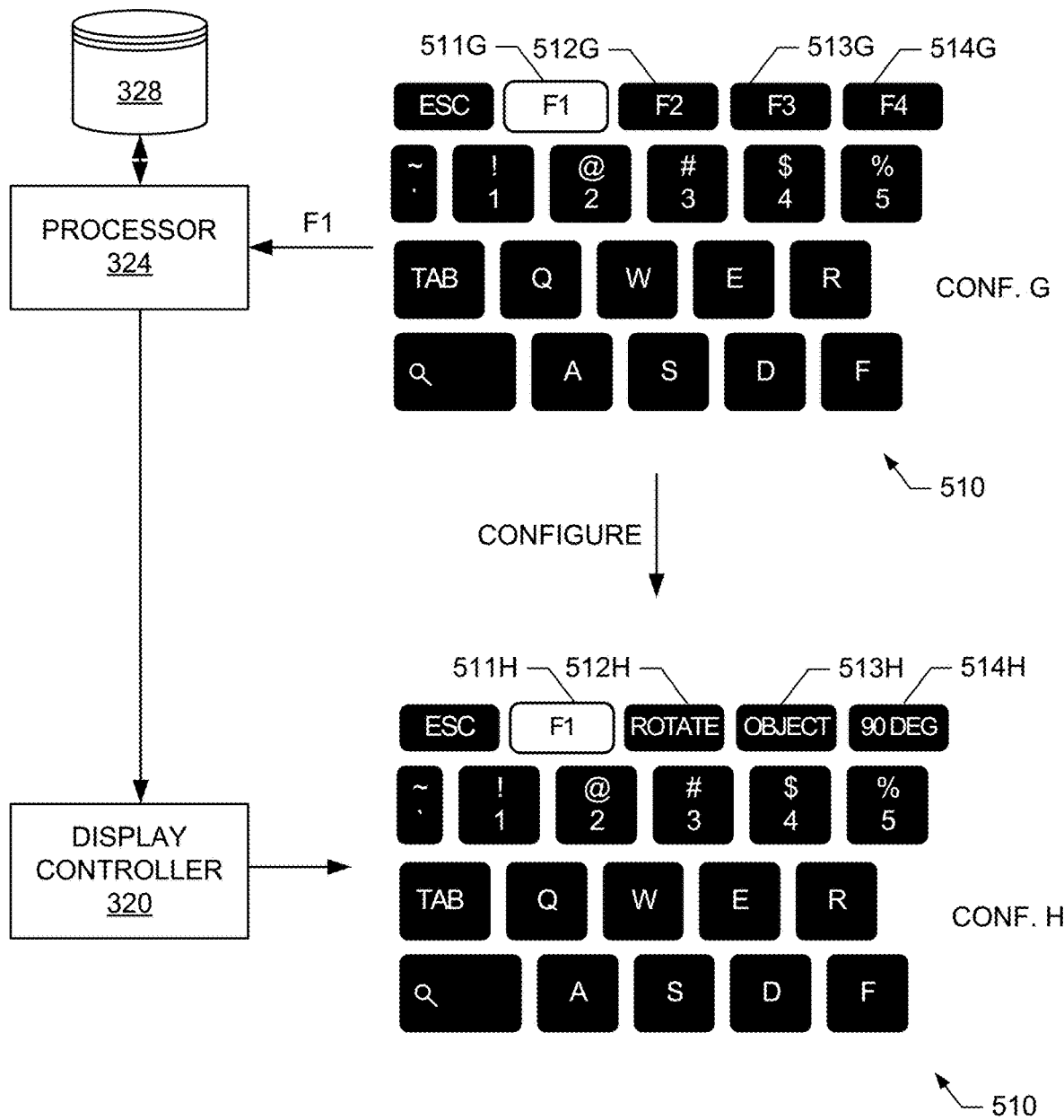
FIG. 10 is a schematic illustration of an example computing device configuring a portion of a keyboard in response to information related to a key in response to a press of the key, in accordance with implementations as described herein.

In the example shown in FIG. 10, the processor 324, via the display controller 320, configures the example portion 510 of the keyboard from a Configuration G to a Configuration H to provide information regarding a selected key 511G, such as a function key F1. In this example, keys 511G, 512G, 513G and 514G respectively correspond to function keys F1, F2, F3 and F4. When, for example, the key 511G is pressed and held, the portion 510 of the keyboard may be re-configured so that the keys 512H, 513H and 514H collectively provide information regarding the key 511G/511H. In the example shown in FIG. 10, the keys 512H, 513H and 514H indicate that key 511G is a shortcut that rotates a selected object by 90 degrees.

Figure 11:
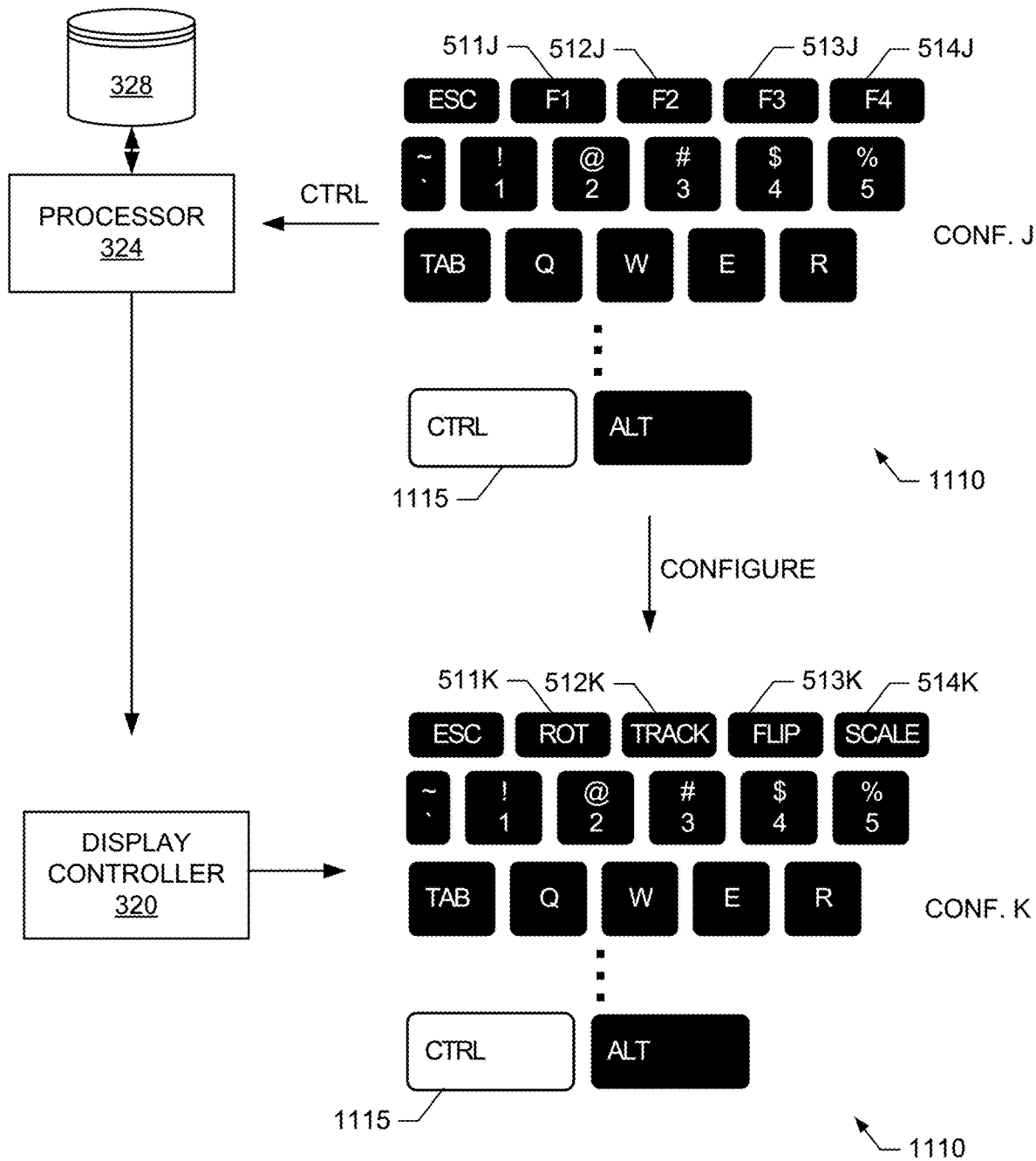
FIG. 11 is a schematic illustration of an example computing device configuring a portion of a keyboard to provide shortcut information, in accordance with implementations as described herein.
Figure 17:
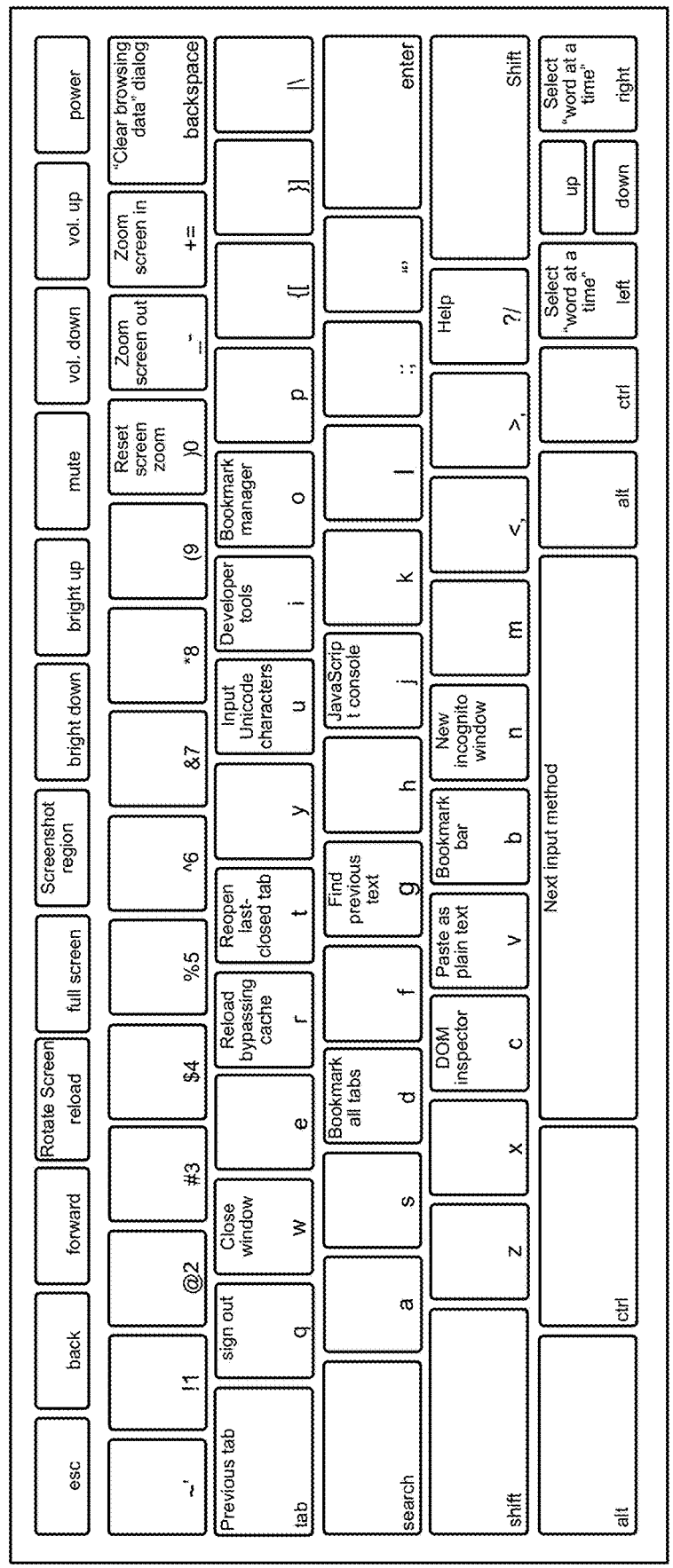
FIG. 17 is an illustration of an example keyboard overlay, in accordance with implementations as described herein.

FIG. 11 illustrates configurations of another example portion 1110 of the example keyboard 202 of FIG. 2. Keys of the example portion of the example keyboard and configurations thereof will be designated as for FIGS. 5-10. In FIG. 11, the processor 324, via the display controller 320, may configure the example portion 1110 of the keyboard from a Configuration J to a Configuration K to provide information regarding yet another type of key, such as a CTRL key 1115. When, for example, the CTRL key 1115 is pressed and held, the example keys 511K, 512K, 513K and 514K provide information regarding the respective shortcuts each key may perform in connection with the CTRL key 1115. In this example, the F1 key 511J may function as a shortcut key to rotate a selected object, the F3 key 513J may function as a shortcut key to flip a selected object, and the like. In some example implementations, a substantially full keyboard overlay (see FIG. 17) can be provided by a set of E ink configurable keys that may provide a visual aid to the user in understanding the various shortcut combinations available in a given configuration (such as, for example, the use of the CTRL key in combination with the C key to copy selected material). When a user presses, for example, the SHIFT key together with the CTRL key, the keys can be re-configured to show and/or explain the shortcuts that are available.

Figure 12:
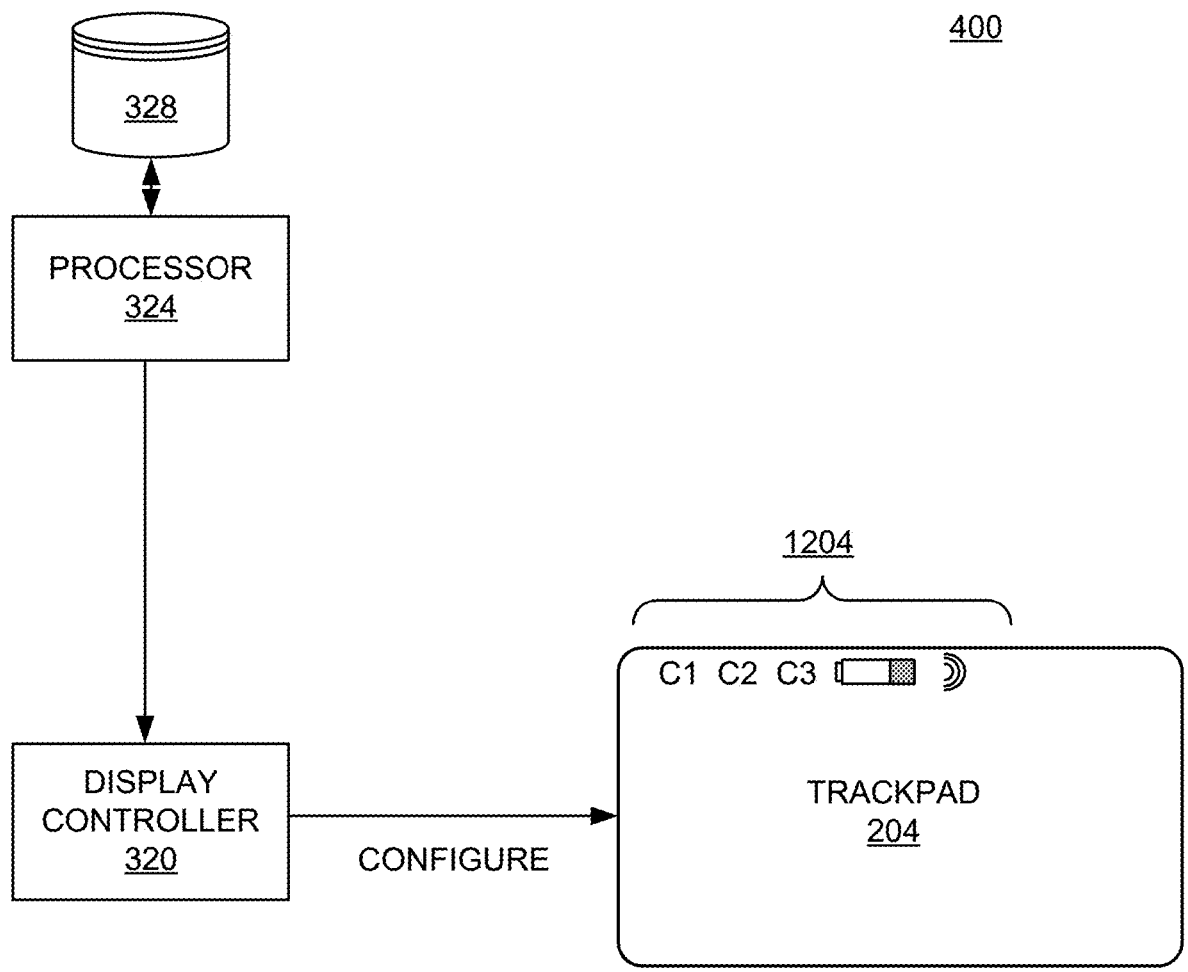
FIG. 12 is a schematic illustration of an example computing device configuring a trackpad corresponding to an application, in accordance with implementations as described herein.

FIG. 12 is a schematic illustration of the example computing device 400 of FIG. 4 configuring the trackpad 204. As shown in FIG. 12, the processor 324, via the display controller 320, may configure the trackpad 204 to display information and/or provide additional functionality 1204 in response to, for example, any of the example conditions, events, etc. disclosed above. In some examples, various areas of the displayed information can be configured to have different functions and, thus, operate as a virtual keyboard and/or portion(s) of a virtual keyboard.

Figure 13:
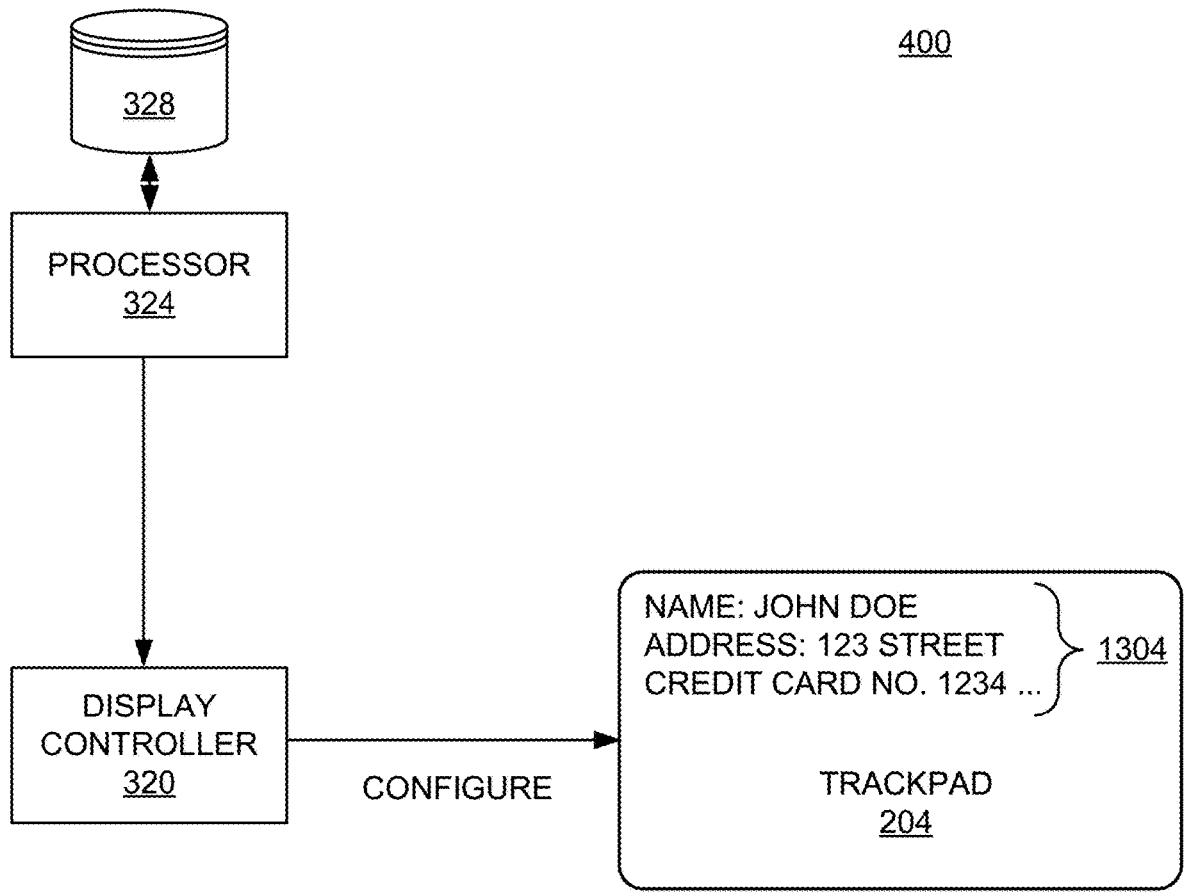
FIG. 13 is a schematic illustration of an example computing device configuring a trackpad to display private information corresponding to a web application, in accordance with implementations as described herein.

As shown in FIG. 13, because the trackpad 204 has more space to display information, for example, compared to the space available on a key of the keyboard, the processor 324, via the display controller 320, may configure the trackpad 204 to display, for example, information 1304 which could not otherwise be accommodated for display on one of the reconfigurable keys, such as, for example, personal information, contact information, and the like. By displaying such information 1304 on the trackpad 204, which is often blocked from viewing by a user's hand, arm, body, etc., additional privacy can be realized.

One or more of the elements and interfaces shown herein may be combined, divided, re-arranged, omitted, eliminated and/or implemented in any other way. Further, one or more circuit(s), programmable processor(s), fuses, application-specific integrated circuit(s) (ASIC(s)), programmable logic device(s) (PLD(s)), field-programmable logic device(s) (FPLD(s)), and/or field-programmable gate array(s) (FPGA(s)), etc. can be used. Moreover, more interfaces and/or elements may be included instead of, or in addition to, those shown, and/or may include more than one of any or all of the illustrated interfaces and elements. The elements shown may, for example, be implemented as machine-readable instructions carried out by one or more processors. A processor, a controller and/or any other suitable processing device such as those shown in FIG. 18 may be used, configured and/or programmed to execute and/or carry out the examples disclosed herein. For example, the disclosed examples may be embodied in program code and/or machine-readable instructions stored on a tangible and/or non-transitory computer-readable medium accessible by a processor, a computer and/or other machine having a processor, such as that discussed below in connection with FIG. 14. Machine-readable instructions comprise, for example, instructions that cause a processor, a computer and/or a machine having a processor to perform one or more particular processes. Many other methods of implementing the disclosed examples may be employed. For example, the order of execution may be changed, and/or one or more of the blocks and/or interactions described may be changed, eliminated, sub-divided, or combined. Additionally, any or the entire example may be carried out sequentially and/or carried out in parallel by, for example, separate processing threads, processors, devices, discrete logic, circuits, etc.

Figure 14:
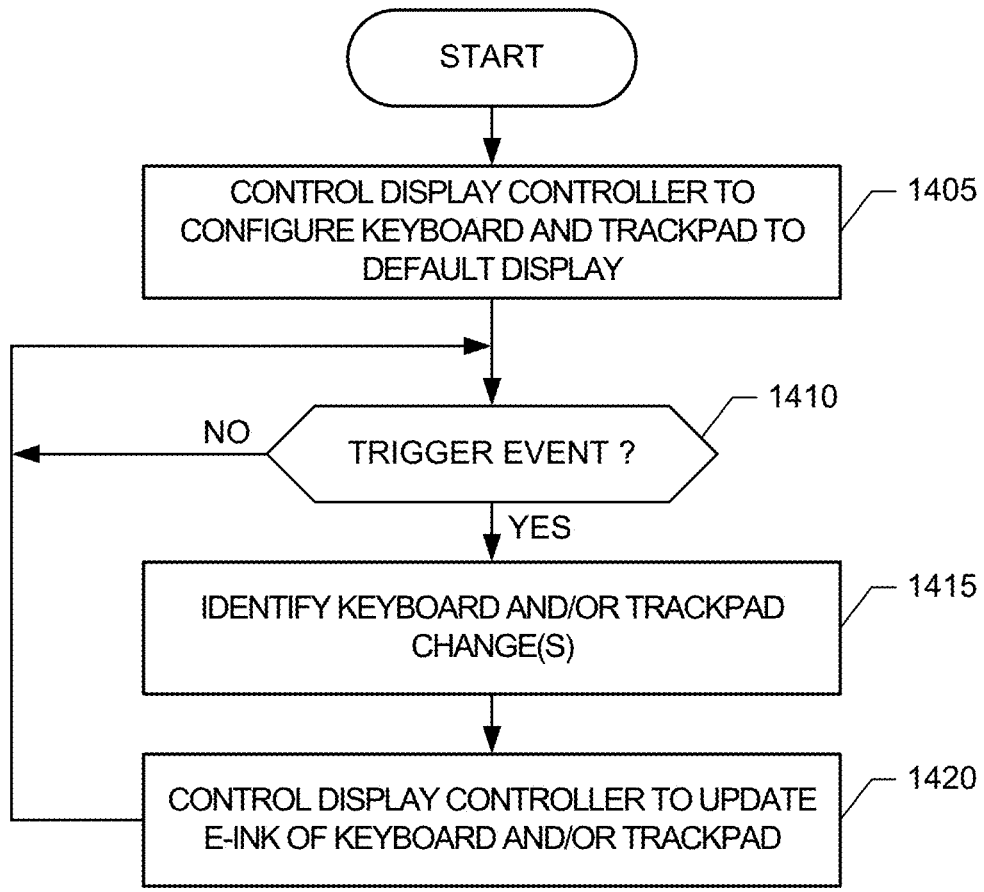
FIG. 14 is a flowchart illustrating an example method that may, for example, be implemented using machine-readable instructions executed by one or more processors to perform the methods and apparatus to change keyboards and trackpads disclosed herein, in accordance with implementations as described herein.

Turning to FIG. 14, an example method 1400 that may be performed to configure keyboards, trackpads, touch pads, touchscreens, etc. as disclosed herein is shown. The example method 1400 of FIG. 14 begins with a processor (e.g., the processor 324) configuring a keyboard, trackpad, touch pad, touchscreen, etc. to a default display (block 1405).

When a triggering event is detected (block 1410), the processor identifies the change(s) to be configured for the keyboard, trackpad, touchscreen, touch pad, etc. (block 1415), and configures the keyboard, trackpad, touchscreen, touch pad, etc., or designated portions thereof, with the changes (block 1420). Control may then resume monitoring for detection of a trigger event (block 1410). In some implementations, the detected triggering event may be a physical triggering event, such as, for example, a detected pressing of a key as described above with respect to FIGS.

9-11. In some implementations, the detected triggering event may be a software related triggering event, such as, for example, application specific configurations, browser specific configurations, notifications and the like, as described above with respect to FIGS. 6-8. In some implementations, the detected triggering event may be a combination of a software related triggering event together with a physical triggering event.

In a system and method, in accordance with implementations described herein, individual user interface elements, or subsets of user interface elements, of a user interface, such as, for example, individual keys or subsets of keys of a keyboard, or portions of other types of user interfaces, may be individually and/or independently re-configurable. For example, in an example implementation discussed above, in which E ink is used to provide visual identification of individual keys of a keyboard, individual keys may be independently, or separately, or independently, re-configurable based on a particular application or function in use, and/or to convey additional information related to the functionality of individual keys and/or subsets of keys. The ability to configure, and re-configure, user interface elements such as keys of a keyboard in this manner may provide for flexibility in the user of the user interface, while still maintaining a physical key interface that provides tactile, or physical, user feedback when making user entries. This physical key interface may facilitate relatively fast, accurate entry of user inputs (for example, when compared to making similar entries on a keyboard interface displayed on a touchscreen), while allowing the user interface to be flexibly configured, and re-configured, and/or to convey additional information to the user which may enhance utility, functionality and convenience for the user.

The use of E ink, as described above, may allow the configuration, and reconfiguration, of individual and/or subsets of user interface elements of a user interface as described above, and or the configuration, and re-configuration of essentially an entire user interface, at relatively low power consumption levels. As noted above, the use of E ink as described above may allow user interface elements of essentially an entire user interface (for example, essentially all the keys of a keyboard) to be configured, and re-configured, for a particular use such as, for example, languages employing different characters, and the like. The use of E ink, as described above, may allow numerous different portions of the user interface, such as, for example, keys/subsets of keys, a trackpad or touchpad, and the like, to be separately configured, and re-configured, and/or highlighted, providing greater flexibility in adapting a user interface for a particular application, and enhancing user conveniences, at relatively low power consumption levels.

The example method 1400 of FIG. 14, or other methods disclosed herein, may, for example, be implemented as machine-readable instructions carried out by one or more processors to control or operate the example display assemblies disclosed herein. A processor, a controller and/or any other suitable processing device may be used, configured and/or programmed to execute and/or carry out the example methods disclosed herein. For instance, the example method 1400 of FIG. 14, or other methods disclosed herein may be embodied in program code and/or machine-readable instructions stored on a tangible and/or non-transitory computer-readable medium accessible by a processor, a computer and/or other machine having a processor, such as that discussed below in connection with FIG. 18. Machine-readable instructions comprise, for example, instructions that cause a processor, a computer and/or a machine having a processor to perform one or more particular processes. Many other methods of implementing the example method 1400 of FIG. 14, or other methods disclosed herein may be employed. For example, the order of execution may be changed, and/or one or more of the blocks and/or interactions described may be changed, eliminated, sub-divided, or combined. Additionally, any of the entire example method 1400 of FIG. 14, or other methods disclosed herein may be carried out sequentially and/or carried out in parallel by, for example, separate processing threads, processors, devices, discrete logic, circuits, etc.

As used herein, the term "computer-readable medium" is expressly defined to include any type of tangible or non-transitory computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a read-only memory (ROM), a random-access memory (RAM), a programmable ROM (PROM), an electronically-programmable ROM (EPROM), an electronically-erasable PROM (EEPROM), an optical storage disk, an optical storage device, a magnetic storage disk, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

Figure 18:
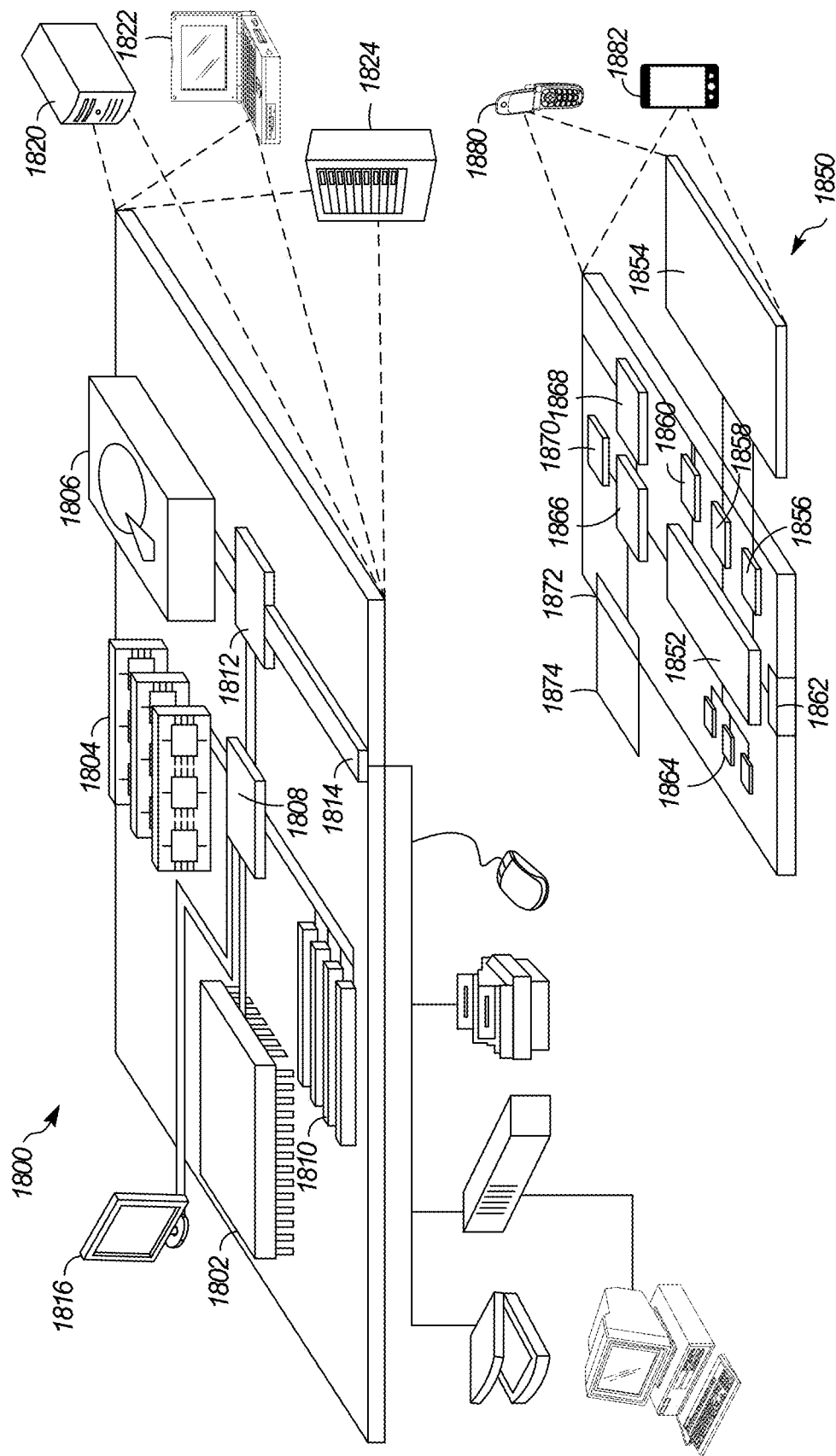
FIG. 18 is a schematic diagram of an example computer device and an example mobile computer device that may be used to implement the example methods and apparatus to change keyboards and trackpads disclosed herein.

Turning to FIG. 18, an example of a generic computer device 1800 and a generic mobile computer device 1850, which may be used with the techniques described here. Computing device 1800 is intended to represent various forms of digital computers, such as laptops, desktops, tablets, workstations, personal digital assistants, televisions, servers, blade servers, mainframes, and other appropriate computing devices. Computing device 1850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1800 includes a processor 1802, memory 1804, a storage device 1806, a high-speed interface 1808 connecting to memory 1804 and high-speed expansion ports 1810, and a low speed interface 1812 connecting to low speed bus 1814 and storage device 1806. The processor 1802 can be a semiconductor-based processor. The memory 1804 can be a semiconductor-based memory. Each of the components 1802, 1804, 1806, 1808, 1810, and 1812, are interconnected using various busses, connections, memories, caches, etc. and may be mounted on a common motherboard or in other manners as appropriate. The processor 1802 can process instructions for execution within the computing device 1800, including instructions stored in the memory 1804 or on the storage device 1806 to light-emitting portion graphical information for a GUI on an external input/output device, such as light-emitting portion 1816 coupled to high speed interface 1808. In other implementations, multiple processors and/or multiple buses may be used, as appropriate, along with multiple memories and types of memory. Also, multiple computing devices 1800 may be connected, with each device providing portions of the necessary operations (e.g., as a server bank, a group of blade servers, or a multi-processor system).

The memory 1804 stores information within the computing device 1800. In one implementation, the memory 1804 is a volatile memory unit or units. In another implementation, the memory 1804 is a non-volatile memory unit or units. The memory 1804 may also be another form of computer-readable medium, such as a magnetic or optical disk.

The storage device 1806 is capable of providing mass storage for the computing device 1800. In one implementation, the storage device 1806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1804, the storage device 1806, or memory on processor 1802.

The high speed controller 1808 manages bandwidth-intensive operations for the computing device 1800, while the low speed controller 1812 manages lower bandwidth-intensive operations. Such allocation of functions is exemplary only. In one implementation, the high-speed controller 1808 is coupled to memory 1804, light-emitting portion 1816 (e.g., through a graphics processor or accelerator), and to high-speed expansion ports 1810, which may accept various expansion cards (not shown). In the implementation, low-speed controller 1812 is coupled to storage device 1806 and low-speed expansion port 1814. The low-speed expansion port, which may include various communication ports (e.g., USB, Bluetooth, Ethernet, Wi-Fi) may be coupled to one or more input/output devices, such as a keyboard, a pointing device, a scanner, or a networking device such as a switch or router, e.g., through a network adapter.

The computing device 1800 may be implemented in a number of different forms, as shown in the figure. For example, it may be implemented as a standard server 1820, or multiple times in a group of such servers. It may also be implemented as part of a rack server system 1824. In addition, it may be implemented in a personal computer such as a laptop computer 1822. Alternatively, components from computing device 1800 may be combined with other components in a mobile device (not shown), such as device 1850. Each of such devices may contain one or more of computing device 1800, 1850, and an entire system may be made up of multiple computing devices 1800, 1850 communicating with each other.

Computing device 1850 includes a processor 1852, memory 1864, an input/output device such as a light-emitting portion 1854, a communication interface 1866, and a transceiver 1868, among other components. The device 1850 may also be provided with a storage device, such as a microdrive or other device, to provide additional storage. Each of the components 1850, 1852, 1864, 1854, 1866, and 1868, are interconnected using various buses, and several of the components may be mounted on a common motherboard or in other manners as appropriate.

The processor 1852 can execute instructions within the computing device 1850, including instructions stored in the memory 1864. The processor may be implemented as a chipset of chips that include separate and multiple analog and digital processors. The processor may provide, for example, for coordination of the other components of the device 1850, such as control of user interfaces, applications run by device 1850, and wireless communication by device 1850.

Processor 1852 may communicate with a user through control interface 1858 and light-emitting portion interface 1856 coupled to a light-emitting portion 1854. The light-emitting portion 1854 may be, for example, a TFT LCD (Thin-Film-Transistor Liquid Crystal Light-emitting portion) or an OLED (Organic Light-emitting Diode) light-emitting portion, or other appropriate light-emitting portion technology. The light-emitting portion interface 1856 may comprise appropriate circuitry for driving the light-emitting portion 1854 to present graphical and other information to a user. The control interface 1858 may receive commands from a user and convert them for submission to the processor 1852. In addition, an external interface 1862 may be provided in communication with processor 1852, so as to enable near area communication of device 1850 with other devices. External interface 1862 may provide, for example, for wired communication in some implementations, or for wireless communication in other implementations, and multiple interfaces may also be used.

The memory 1864 stores information within the computing device 1850. The memory 1864 can be implemented as one or more of a computer-readable medium or media, a volatile memory unit or units, or a non-volatile memory unit or units. Expansion memory 1874 may also be provided and connected to device 1850 through expansion interface 1872, which may include, for example, a SIMM (Single Inline Memory Module) card interface. Such expansion memory 1874 may provide extra storage space for device 1850, or may also store applications or other information for device 1850. Specifically, expansion memory 1874 may include instructions to carry out or supplement the processes described above, and may include secure information also. Thus, for example, expansion memory 1874 may be provide as a security module for device 1850, and may be programmed with instructions that permit secure use of device 1850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer or machine-readable medium, such as the memory 1864, expansion memory 1874, or memory on processor 185 that may be received, for example, over transceiver 1868 or external interface 1862.

Device 1850 may communicate wirelessly through communication interface 1866, which may include digital signal processing circuitry where necessary. Communication interface 1866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1868. In addition, short-range communication may occur, such as using a Bluetooth, Wi-Fi, or other such transceiver (not shown). In addition, GPS (Global Positioning System) receiver module 1870 may provide additional navigation- and location-related wireless data to device 1850, which may be used as appropriate by applications running on device 1850.

Device 1850 may also communicate audibly using audio codec 1860, which may receive spoken information from a user and convert it to usable digital information. Audio codec 1860 may likewise generate audible sound for a user, such as through a speaker, e.g., in a handset of device 1850. Such sound may include sound from voice telephone calls, may include recorded sound (e.g., voice messages, music files, etc.) and may also include sound generated by applications operating on device 1850.

The computing device 1850 may be implemented in a number of different forms, as shown in the figure. For example, it may be implemented as a cellular telephone 1880. It may also be implemented as part of a smart phone 1882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a light-emitting portion device (e.g., a CRT (cathode ray tube) or LCD (liquid crystal light-emitting portion) monitor) for light-emitting portioning information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Connecting lines and connectors shown in the various figures presented are intended to represent exemplary functional relationships and/or physical or logical couplings between the various elements. It should be noted that many alternative and/or additional functional relationships, physical connections or logical connections may be present. Moreover, no item or component is essential to the practice of this disclosure unless the element is specifically described as "essential" or "critical". Additionally, the figures and/or drawings are not drawn to scale, but rather are drawn for clarity of illustration and description.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A computer-implemented method, comprising:
    detecting, by a processor of a computing device, an application executing on the computing device, the computing device including a base portion and a lid portion coupled to the base portion, the base portion having a user interface including a physical keyboard and a touch input portion, the touch input portion being separate from the physical keyboard and occupying a region of the base portion outside of the physical keyboard, and the lid portion including a display;
    determining, by the processor, a configuration to be implemented by the user interface associated with the application executing on the computing device; and
    configuring the touch input portion of the user interface provided on the base portion of the computing device in response to the determination of the configuration, including:
        changing an appearance of the touch input portion of the user interface to display at least one user interface element associated with the application executing on the computing device; and
        changing a functionality associated with the touch input portion of the user interface to include functionality associated with the at least one user interface element.

2. The method of claim 1, wherein changing the appearance of the touch input portion of the user interface includes changing the appearance of the touch input portion of the user interface to correspond to the changed functionality of the touch input portion of the user interface.

3. The method of claim 1, wherein configuring the touch input portion of the user interface includes configuring electronic ink associated with the touch portion of the user interface, and wherein changing the appearance of the touch input portion of the user interface includes re-configuring the electronic ink associated with the touch input portion.

4. The method of claim 3, wherein changing the appearance of the touch input portion of the user interface includes re-configuring electronic ink associated with at least one user interface element displayed by the touch input portion of the user interface.

5. The method of claim 1, wherein configuring the touch input portion of the user interface includes:
   detecting a triggering event in the application executing on the computing device; and
   configuring the touch input portion of the user interface in response to the detected triggering event.

6. The method of claim 5, wherein the application is a web browsing application, and wherein the triggering event is a command present in a web site, the method further comprising:
   parsing the website to obtain key control information; and
   configuring the electronic ink according to the key control information.

7. The method of claim 5, wherein the triggering event is an activation of a modifier key of the user interface, and wherein changing the appearance of the touch input portion of the user interface includes re-configuring electronic ink associated with the touch input portion of the user interface to correspond to an effect of the modifier key on the touch input portion of the user interface.

8. The method of claim 5, wherein the triggering event includes a notification of at least one of an incoming email, an incoming message, a detected error, an incoming alert, or an offer.

9. The method of claim 1, wherein the touch input portion of the user interface occupies a region of a touchpad or trackpad on the base portion of the computing device.

10. The method of claim 5, wherein changing the appearance and the functionality of the touch input portion of the user interface includes reconfiguring the user interface from a first configuration to a second configuration that is different from the first configuration in response to the detected triggering event.

11. A computer-implemented method, comprising:
    detecting, by a processor of a computing device, a touch input at a touch input portion of a user interface of the computing device, the computing device including a base portion and a lid portion coupled to the base portion, the base portion including the user interface, the user interface including a physical keyboard and the touch input portion, the touch input portion being separate from the physical keyboard and occupying a region on the base portion outside of the physical keyboard on the base portion, and the lid portion including a display;
    determining, by the processor, a configuration to be implemented by the user interface of the computing device in response to the detected touch input; and
    displaying, at the touch input portion of the user interface, user interface elements corresponding to the determined configuration of the user interface in response to the detected touch input and the determined configuration, including:
        changing an appearance of at least a portion of the touch input portion of the user interface to include display of at least one user interface element; and
        changing a functionality associated with at least a portion of the touch input portion of the user interface to include functionality associated with the at least one user interface element.

12. The computer-implemented method of claim 11, wherein the touch input portion of the user interface occupies a region of a touchpad or a trackpad on the base portion of the computing device.

13. The computer-implemented method of claim 11, wherein the detected touch input corresponds to a triggering event, triggering re-configuration of the user interface.

14. The computer-implemented method of claim 11, wherein the user interface comprises a plurality of user interface elements provided on the base portion of the computing device, and wherein displaying user interface elements corresponding to the determined configuration of the user interface in response to the detected touch input and the determined configuration includes:
    re-configuring an appearance of a subset of user interface elements of the plurality of user interface elements of the user interface; and
    displaying the re-configured subset of user interface elements at the user interface together with the remaining user interface elements of the plurality of user interface elements.

15. The computer-implemented method of claim 11, wherein the user interface comprises a plurality of user interface elements provided on the base portion of the computing device, the plurality of user interface elements being displayed at a first portion of the user interface, and wherein displaying user interface elements corresponding to the determined configuration of the user interface in response to the detected touch input and the determined configuration includes:
    displaying at least one new user interface element at a second portion of the user interface in response to the detected touch input and the determined configuration, the second portion of the user interface being separate from the first portion of the user interface on the base portion of the computing device, such that the at least one new user interface element displayed at the second portion of the user interface occupies a portion of the user interface not previously occupied by the plurality of user interface elements.

16. The computer-implemented method of claim 11, wherein changing the appearance and the functionality of the portion of the user interface includes reconfiguring the user interface from a first configuration to a second configuration that is different from the first configuration in response to the detected touch input, including:
    changing the functionality of the user interface; and
    changing the appearance of the user interface to correspond to the changed functionality of the user interface, including re-configuring electronic ink associated with the user interface.

17. A computing device, including:
    a base portion including a user interface, the user interface including a physical keyboard occupying a first portion of the base portion and a touch input portion occupying a second portion of the base portion, the second portion being separate from the first portion;
    a lid portion rotatably coupled to the base portion, the lid portion including a display;
    a processor;
    a memory; and
    computer program product tangibly embodied on a non-transitory computer-readable storage medium, comprising instructions that, when executed by processor, cause the computing device to:

detect an application executing on the computing device;
determine a configuration to be implemented by the user interface of the computing device associated with the application executing on the computing device; and
configure the touch input portion of the user interface of the computing device in response to the determination of the configuration and the application executing on the computing device, including:
    changing an appearance of the touch input portion of the user interface to display at least one user interface element; and
    changing a functionality associated with the touch input portion of the user interface to include functionality associated with the at least one user interface element.

* * * * *